United States Patent [19]

Knothe et al.

[11] 4,236,590
[45] Dec. 2, 1980

[54] BALANCE WITH COMPENSATED LOADING AND REFERENCE SYSTEMS

[75] Inventors: Erich Knothe, Bovenden; Franz-Josef Melcher, Hardegsen, both of Fed. Rep. of Germany

[73] Assignee: Sartorius GmbH, Göttingen, Fed. Rep. of Germany

[21] Appl. No.: 5,830

[22] Filed: Jan. 23, 1979

[30] Foreign Application Priority Data

Jan. 27, 1978 [DE] Fed. Rep. of Germany ....... 2803682

[51] Int. Cl.³ .................... G01G 19/00; G01G 7/00
[52] U.S. Cl. .................................. 177/200; 177/212
[58] Field of Search .................... 177/25, 200, 212; 364/567, 568

[56] References Cited

U.S. PATENT DOCUMENTS

| | | | |
|---|---|---|---|
| 3,322,222 | 5/1967 | Baur | 177/200 |
| 3,494,437 | 2/1970 | Fathauer | 177/200 |
| 3,786,883 | 1/1974 | Kunz | 177/212 X |
| 3,789,202 | 1/1974 | Yamanaka | 364/567 |
| 3,916,173 | 10/1975 | Williams, Jr. et al. | 177/200 UX |
| 3,968,850 | 7/1976 | Gaskill | 177/212 X |
| 4,139,070 | 2/1979 | Hanson et al. | 177/200 |

Primary Examiner—George H. Miller, Jr.
Attorney, Agent, or Firm—Browdy and Neimark

[57] ABSTRACT

A balance having an electromagnetically compensated loading system and an electromagnetically compensated reference system includes respective signal pathways provided for feeding signals which arise in or are derived from the two systems. These signals are to be compared for measurement. The signals from the two pathways are processed coincidentally with one another for digitization, beginning simultaneously and ending simultaneously.

9 Claims, 2 Drawing Figures

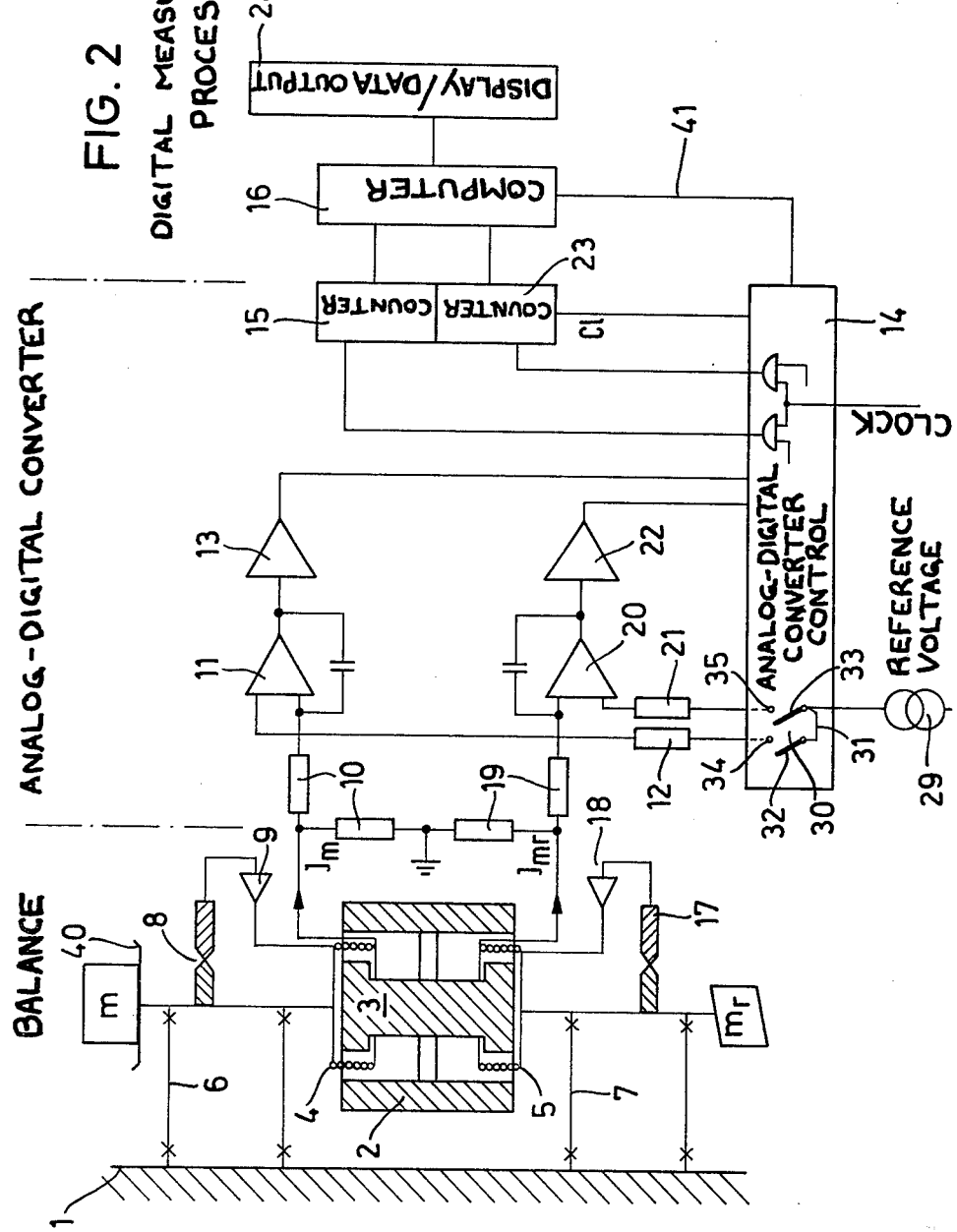

BALANCE WITH COMPENSATED LOADING AND REFERENCE SYSTEMS

BACKGROUND OF THE INVENTION

The invention relates to a balance with an electromagnetically compensated loading system and an electromagnetically compensated reference system, wherein signals which appear or are derived in the loading or measurement pathways are compared with signals which appear or are derived in the reference pathway, for measurement.

Balances are known from German Pat. No. 1,194,167 and German Auslegeschrift (Published Patent Application) No. 2,233,850 wherein the value of an electric current, flowing through a reference system compensating coil, is determined as a function of the deflection of the coil. The current with this value is then supplied, as a compensating current, to a load coil in the form of spaced square-wave pulses, with the pulse length determined by the deflection of the load coil. Load compensation takes place only at separate time intervals; this can lead to fluctuations. The pulse lengths are converted to digital values.

Difficulties arise in particular in signal processing of signals from the measurement and reference pathways with respect to vibration optimization of processing, especially with digital processing.

SUMMARY OF THE INVENTION

According to the present invention, optimum processing is achieved when the signals for digitization from the two pathways are processed coincidentally with one another, beginning simultaneously and ending simultaneously.

Advantageously, signals which correspond completely to one another are thus obtained for subsequent processing, these signals being comparable to one another with zero error because of their overlapping derivation, and therefore offer unambiguous results because they clearly were derived from an identical stage of the procedure.

Analog/digital converters (A/D converters) can be provided especially advantageously in the load path, or measuring path, and reference path, and each of these A/D converters can be connected to the same reference voltage source. Advantageously, the switching times of the reference voltage source can be short by comparison with the resonance time of the load and reference balance.

Advantageously, the evaluation times of the reference voltage source can be determinable by a computer in a data processing unit connected in series with the A/D converters. A computer can be used advantageously to determine the number of partial integrations which can be used for formation of the total measured value, whereby the partial integrations or partial measurements need not be sequential.

It may be advantageous for the switching of the reference voltage source by the computer to be accomplished through an A/D converter control. In addition, a counter can be connected in series with each A/D converter, the counting position of this counter being transmittable, possibly after processing in the computer, to a readout and/or a data output for further processing. In particular, processing in the computer can constitute quotient formation from the counter values.

In a special embodiment of the invention, the position of a load coil in an associated magnet air gap can be determinable by a position sensor, and a corresponding signal can be transmittable to an integrating comparator via the load coil, with a reference voltage being transmittable from the common reference source for zeroing, the output of the integrating comparator being connected with an A/D converter control circuit. A signal amplifier can then be connected between the position sensor and the load coil and a precision resistor can be connected in series with the integrating comparator. In addition, a resistance can be connected between the integrating comparator and the reference voltage source.

Advantageously, an amplifier can be connected in series with the integrating comparator, the amplifier measuring the integration state of the integrating comparator, the amplifier supplying a corresponding logical measured value to the A/D converter control circuit the control circuit supplying a number of pulses corresponding to the measured result to the corresponding counter.

In this embodiment, the position of a reference coil in an associated magnet air gap can be determinable by a position sensor, and a corresponding signal can be transmittable to an integrating comparator via the reference coil, with a reference voltage from the reference voltage source being transmittable to said integrating comparator for zeroing, this circuit being connected with the A/D converter control circuit, a signal amplifier being connected between the position sensor and the reference coil.

Here again, a precision resistor can be connected in series with the integrating comparator. A resistor can be connected between the integrating comparator and the reference voltage source, and an amplifier can be connected in series with the integrator, the amplifier measuring the integration state of the integrating comparator, the amplifier delivering a corresponding logical measured value for the reference path to the A/D convertor control circuit, control the circuit delivering a number of pulses to the corresponding counter which corresponds to the measurement result.

In this embodiment, the resistors can be eliminted with an appropriate circuit design.

For zeroing, a reference voltage of opposite polarity can be supplied to the integrating comparator from the common reference voltage source. In this balance, the computer connected in series with the counter can form a quotient from the values, the quotient being displayable on a readout or suitable for further processing.

An especially simple design is achieved when the load coil and the reference coil are arranged in a permanent-magnet system. Especially simple conditions are present if the reference coil supports a constant load.

BRIEF DESCRIPTION OF THE DRAWING

Embodiments of the invention are to be described herein below in the specification reference being made to the figures in the drawing.

FIG. 2 is a circuit in which a quotient balance is used.

DETAILED DESCRIPTION OF THE PREFERRED EMOBDIMENT

Figure 1:
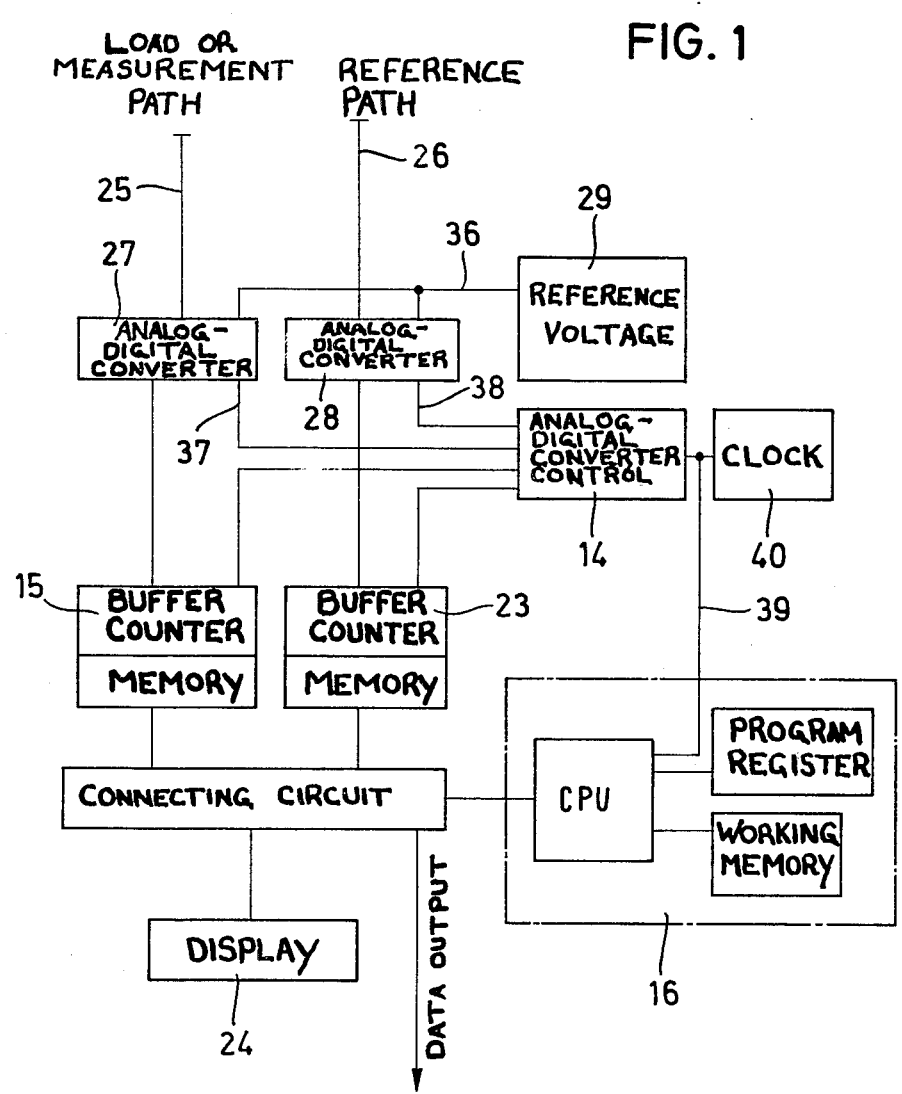
FIG. 1 is a block schematic diagram of a circuit forming part of an exemplary embodiment of the invention.

In FIG. 1, two signal pathways 25 and 26 are shown schematically at the upper left. The pathway 25 is a load or measuring pathway of a balance with an electromagnetically compensated load system. The details of the balance are not shown. Certain signals arise or are derived in this load path or measurement path, these signals being intended for further processing. In addition, a reference pathway 26 is shown in schematic form which is associated with the electromagnetically compensated reference system, and the signals which arise or are derived in this pathway are intended for comparison with the signals in the load pathway or measurement pathway 25 for measurement or weighing.

The signals in the two pathways 25 and 26 must be coincidentally integrated for digitization beginning simultaneously and ending simultaneously.

An analog-digital converter (A/D converter) 27 is connected to the pathway 25, and an A/D converter 28 is connected to the pathway 26. As shown in FIG. 1, the two A/D converters 27 and 28 are connected by a common lead 36 to a single reference voltage source 29. This reference voltage source supplies the necessary reference voltages and compensating voltages for integration and zeroing to the A/D converters 27 and 28.

The A/D converters 27 and 28 are connected respectively by leads 37 and 38 to A/D converter control circuit 14. The A/D converter control circuit 14 is connected by a lead 39 with the signal processing unit (CPU) of a computer 16, this computer 16 forming part of a data-processing device, which further processes the signals generated by A/D converters 27 and 28. The A/D converter control circuit 14 is driven from a clock 40 by timed pulses.

The circuit described above operates in the following manner: under control of the computer 16 and with interpolation of the A/D converter control circuit 14, the reference voltage source 29 is simultaneously connected to the two A/D converters 27 and 28 via the leads 37 and 38, so that processing of the signals via the pathways 25 and 26 begins simultaneously, and is conducted coincidentally, so that the signals produced by the A/D converters 27 and 28 correspond to identical phases of weighing.

The signals produced by the A/D converters 27 and 28 are counted in corresponding buffer counters 15 and 23 and processed in the computer 16, the signal processing section of the computer being coupled to the respective memory outputs from the counters 15 and 23 via a connecting circuit. In particular, quotients can be generated from the values from the counters 15 and 23 in the computer 16, and these quotients can then be displayed on a readout 24 and/or can be delivered as an additional data output, via the connecting circuit.

This circuit allows optimum evaluation of the signals in the measurement and reference pathways.

FIG. 2 is a schematic diagram of a quotient balance. In this quotient balance, a permanent magnet 2 with a core 3 is mounted on a stand 1. A load coil 4 is suspended in the air gap formed by the permanent magnet 2 the core 3, this coil being guided by parallel guides 6. The load coil 4 supports a pan 40 upon which a load m is placed.

The position into which the load coil 4 is thus forced is measured by a position sensor 8, thus producing a signal in known fashion, this signal being amplified in an amplifier 9 and supplied to the load coil 4 for compensation. This signal travels to an integrating comparator (integrator) 11 from the load coil 4 via precision resistive circuit 10, composed of two precision resistors.

The integrating comparator 11 is connected to the reference voltage source 29 by a resistor 12 and a switch 30 in the A/D converter control circuit 14. This reference voltage source 29 can supply a voltage of opposite polarity to zero the integrating comparator 11. The resultant state of the integrating comparator 11 is then measured in amplifier (comparator) 13 and logically supplied to the A/D converter control circuit 14. This A/D converter control circuit 14 generates a number of pulses which corresponds to the logical measured value, and this number of pulses is added in the counter 15 and processed further in the computer 16.

The reference balance is provided with a reference coil 5, this coil being suspended in the air gap formed by the same permanent magnet 2 and the core 3. The reference coil 5 is guided by a parallel guide 7 and supports a reference weight $m_r$, which, for example, can be constant. The position of the reference coil 5 is measured by a position sensor 17, and a corresponding signal is generated in known fashion, the signal being amplified in amplifier 18 and being further guided to an integrating comparator (integrator) 20 through the reference coil 5 via a precision resistive circuit 19, composed of two precision resistors. The integrating comparator 20 is likewise connected via the switch 30 to the same reference voltage source 29 which supplies a signal of opposite polarity via a resistor 21 for zeroing the integrating comparator 20. The resultant state of the integrating comparator 20 is measured with a series-connected amplifier (comparator) 22 and supplied logically to the central A/D converter control circuit 14, the control circuit generating a number of pulses which corresponds to the logical measured result which is then supplied to the counter 23 for addition, and the number of pulses is then processed further by the computer 16.

The computer 16, is kmown fashion, forms the quotient from the two measured values of the counters 15 and 23, and the result is available on the readout 24 and as a data output, if desired for further processing.

As FIG. 2 shows, the computer 16 is schematically connected via a lead 41 with the A/D converter control circuit 14, this connection serving to control the double-pole switch 30. This double-pole switch 30 has two parallel switch arms 32 and 33, which can be moved simultaneously. One end of each of these switch arms 32 and 33, as shown at 31, is connected with the same end of the switch arm, and these ends are both connected to the reference voltage source 29. Two switch poles 34 and 35 are provided in the switch 30, and leads run respectively from these switch poles 34 and 35 to the integrating comparators 11 and 20. The switch 30 is shown in its open position. In this position the two integrating comparators 11 and 20 are simultaneously separated from the common voltage source 29. When the double-poles switch 30 is brought to its closed position by the computer 16, in which position the contact arms 32 and 33 touch contact poles 34 and 35, the two integrating comparator 11 and 20 are simultaneously connected with the reference voltage source 29 and the integration of the separately supplied signals from the resistive circuits 10 and 19 can begin simultaneously. When the switch 30 is brought to the open position shown, the two integrating comparators 11 and 20 are disconnected from reference voltage source 29 and integration is terminated.

It is to be appreciated that the resistors 10, 19, 12, and 21 can be eliminated in an appropriately designed circuit.

The number and chronological relationship of the partial measurement results are advantageously determined by the computer 16.

It is to be appreciated that the foregoing description and accompanying drawing figures relate to an illustrative embodiment given by way of example, not by way of limitation. Numerous variants and other embodiments are possible without departing from the spirit and scope of the invention, its scope being defined in the appended claims.

What is claimed is:

1. In a balance with an electromagnetically compensated loading system and an electromagnetically compensated reference system, wherein signals which arise or are derived in a load pathway are compared for measurement with signals which appear or are derived in a reference pathway, the improvement comprising means for coincidentally processing the signals from said pathways for digitization, beginning simultaneously and ending simultaneously, and including a respective analog-to-digital converter connected in said load pathway and in said reference pathway, and a reference voltage source, each of said converters being connected to said reference voltage source.

2. An improved balance according to claim 1, including a computer connected in series with respective counters which are connected to respective ones of said analog-to-digital converters, said computer forming one or more quotients from count values in said counters, said quotients being displayable on readout means.

3. An improved balance according to claim 1, wherein said reference voltage source is a switched source, switching times of said reference voltage source being short in comparison with resonance time of the load and reference systems.

4. An improved balance according to claim 3, including an analog-to-digital control circuit and a computer, evaluation of the reference voltage source being effected by said computer under control of said control circuit.

5. An improved balance according to claim 1, including a readout means and a respective counter connected in series with each said analog-to-digital converter, the counting positions of said counters being transmittable to said readout.

6. An improved balance according to claim 5, including a computer, said computer being operatively arranged to process the counting positions, the processed positions being transmittable to said readout.

7. An improved balance according to claim 1, including data output means, and a respective counter connected in series with each said analog-to-ditital converter, the counting position of said counters being transmittable to said data output means.

8. An improved balance according to claim 7, including a computer, said computer being operatively arranged to process the counting positions, the processed positions being transmittable to said data output means.

9. An improved balance according to either claim 6 or claim 8, wherein said computer processes said counting positions to provide a quotient formation from the values thereof.

* * * * *